US 6,637,702 B1

(12) United States Patent
McCandless (10) Patent No.: US 6,637,702 B1
(45) Date of Patent: Oct. 28, 2003

(54) NESTED BEAM DEPLOYABLE SOLAR ARRAY

(75) Inventor: John Gregory McCandless, Santa Clara, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/128,421

(22) Filed: Apr. 24, 2002

(51) Int. Cl.$^7$ ................................................ B64G 1/44
(52) U.S. Cl. ........................................ 244/173; 52/79.5
(58) Field of Search ............................ 244/158 R, 168, 244/173; 52/108, 79.5

(56) References Cited

U.S. PATENT DOCUMENTS

| | | | | |
|---|---|---|---|---|
| 366,365 A | * | 7/1887 | Averberg | |
| 1,546,698 A | * | 7/1925 | Zoll et al. | |
| 3,460,992 A | * | 8/1969 | Avilov et al. | |
| 4,148,163 A | * | 4/1979 | Chenin et al. | |
| 4,155,524 A | * | 5/1979 | Marello et al. | |
| 4,747,566 A | * | 5/1988 | Kiendl | |
| 4,779,826 A | * | 10/1988 | Kiendl | |
| 5,098,042 A | * | 3/1992 | Viale | |
| 5,296,044 A | | 3/1994 | Harvey et al. | |
| 5,319,905 A | * | 6/1994 | Szirtes | |
| 5,730,577 A | * | 3/1998 | Jones | |
| 5,833,176 A | | 11/1998 | Rubin et al. | |
| 5,857,648 A | * | 1/1999 | Dailey et al. | |
| 6,091,016 A | | 7/2000 | Kester | |
| 6,147,294 A | | 11/2000 | Dailey et al. | |
| 6,158,943 A | * | 12/2000 | Sullivan | |
| 6,311,930 B1 | * | 11/2001 | Hersh et al. | |
| 6,343,442 B1 | * | 2/2002 | Marks | |

FOREIGN PATENT DOCUMENTS

JP          0282097  * 11/1989  ................. 244/173

* cited by examiner

*Primary Examiner*—Tien Dinh
(74) *Attorney, Agent, or Firm*—Townsend and Towsend and Crew LLP (57) ABSTRACT

A solar array includes a plurality of panels that are individually supported by beams that nest within each other in the stowed position to minimize the volume of the structure prior to deployment. The beams are pivotally connected to each other are deployed using any conventional means.

22 Claims, 10 Drawing Sheets

NESTED BEAM DEPLOYABLE SOLAR ARRAY

BACKGROUND OF THE INVENTION

1. Field of the Invention

The present invention relates generally to the field of solar panels or arrays, and more specifically, solar arrays that can be stowed during launch in a relatively small volume, and easily deployed in space to a usable size while maintaining a high degree of stiffness.

2. Description of the Related Art

Solar arrays are used by satellites and other space vehicles to generate electricity, and thus provide a valuable and renewable source of power to operate electronics and motors carried by the vehicle. The capacity to produce power is directly related to the exposed surface area of the array, but large arrays are difficult and expensive to launch. It is thus common practice to use arrays that are stowed during launch in a relatively small volume, and then deployed generate a large power-producing surface area when a desired position in space is achieved.

Spacecraft deployable solar arrays often need to achieve a high degree of stiffness after being deployed, which tends to counter the objective of having a small stowed volume. Generally this is because a smaller stowed volume reduces space available for tall, stiff sections, or would mandate a greater number of joints, connections, hinges, etc., each of which would potentially impact negatively on the deployed stiffness of the array. Moreover, in attempting to create a smaller stowed volume, it sometimes becomes necessary to design and use mechanically complex hinges. As a general rule, however, hinge cost usually goes up with complexity, while reliability potentially goes down.

U.S. Pat. No. 5,833,176 to Rubin et al. describes a bowed solar array in which the array consists of several panels that are connected to each other through hinges. In the stowed position, the panels fold onto each other in an accordion fashion so that in the stowed position, the panels take up a smaller volume relative to the deployed position. A tensioning mechanism includes pulleys associated with respective panels, and cables inter-connecting the pulleys of the array. The bowed panels and tensioning mechanism are intended in part to increase deployed stiffness.

U.S. Pat. No. 6,091,016 to Kester describes a solar panel assembly which uses a plurality of panels that are stowed one on top of the other, and deployed in accordion fashion. The panels are connected to each other by parallel hinges, and in the deployed state, the panels are curved in a direction parallel to the panel edges to which the panels are attached, again with the intent of increasing deployed stiffness.

U.S. Pat. No. 5,296,044 to Harvel et al. describes a solar array that deploys from a folded, flat triangular form to a circular deployed shape. Solar cells of suitable size and shape are mounted on a plurality of gores. When stowed, a lead spar is rotated to reduce the apex angles between adjacent spars, so the gores fold along their mid-gore flexures.

U.S. Pat. No. 6,147,294 to Dailey et al. describes a D-wing deployable solar array in which the panels that make up the array stow flat and are deployed in a bowed "D" shaped configuration. The patent describes efforts to enhance rigidity through the use of greater inertia.

In general, deployable solar arrays are available in various forms, some of which recognize and address stowed volume and deployed stiffness as problems. These include, but are not limited to traditional flat-panel rigid arrays that deploy accordion style, rigid arrays reinforced with deployable structures, flexible arrays supported by deployable masts or other structures, and curved/strained arrays.

Compared to the present invention, traditional flat-panel rigid arrays of equivalent power and stiffness would require extremely thick panels that would increase stowed volume and mass. Rigid arrays with deployable structures are generally complex and not cost effective. They may also consume substantial stowed volume. Flexible arrays stow in a very small volume, but rely on a deployable mast or other structure for deployed support, which can be somewhat heavy and complex. Moreover, they tend to lack the requisite stiffness, and generally provide no power when stowed. Curved/strained arrays are a variant from traditional designs, but are limited by the amount of strain that cast be applied due to the brittle nature of high-efficiency single-crystal solar cells. Amorphous cells can accept high levels of strain to help attain a desired degree of stiffness, but amorphous cells lack the efficiency of single-crystal cells.

A continuing need exists for improved solar panel structures that have relatively high structural stiffness in the deployed state, while maintaining a good ratio between stowed and deployed Volume.

SUMMARY OF THE INVENTION

The present invention provides a relatively high degree of deployed stiffness, a relatively compact stowed volume, and a relatively simple deployment mechanism. The invention also provides a favorable ratio of deployed stiffness to stowed volume for a given power output with a relatively simple design that is cost effective to produce.

The invention includes a series of similar or identical stiff beams connected by similar or identical stiff hinges that support a series of similar or identical non-structural panels, which in a typical field of use, are populated with solar cells. The centers of the beams are offset by approximately one beam width (plus clearance) so that they nest inside each other when stowed. The panels are attached alternately on the top or bottom of the stiff beams so that the panels nest without interference.

The surface between the beams is joined by another set of panels attached to the surface opposite that which the outer panels are attached to. These center panels add additional rigidity and are optionally populated with solar cells, when used in that field of use.

The result of using nesting beams is an array that stows and deploys in an accordion fashion, which is capable of being deployed using conventional hinges and dampers of traditional design.

The invention provides improved ratios of stowed volume to deployed stiffness for a given power output. The design is also highly producible due to the use of a number of similar or identical panels, beams, and hinges. It is also scalable, in the sense that it can be sized to the requirements of a given application, to attain almost any stiffness requirement with an efficient and producible solution. Also, the present structure can provide power when stowed, unlike flexible arrays.

The features and advantages of the invention will become more apparent from the following detailed description when taken in conjunction with the illustrative embodiments in the accompanying drawings.

DETAILED DESCRIPTION OF THE PREFERRED EMBODIMENTS

Figure 1:
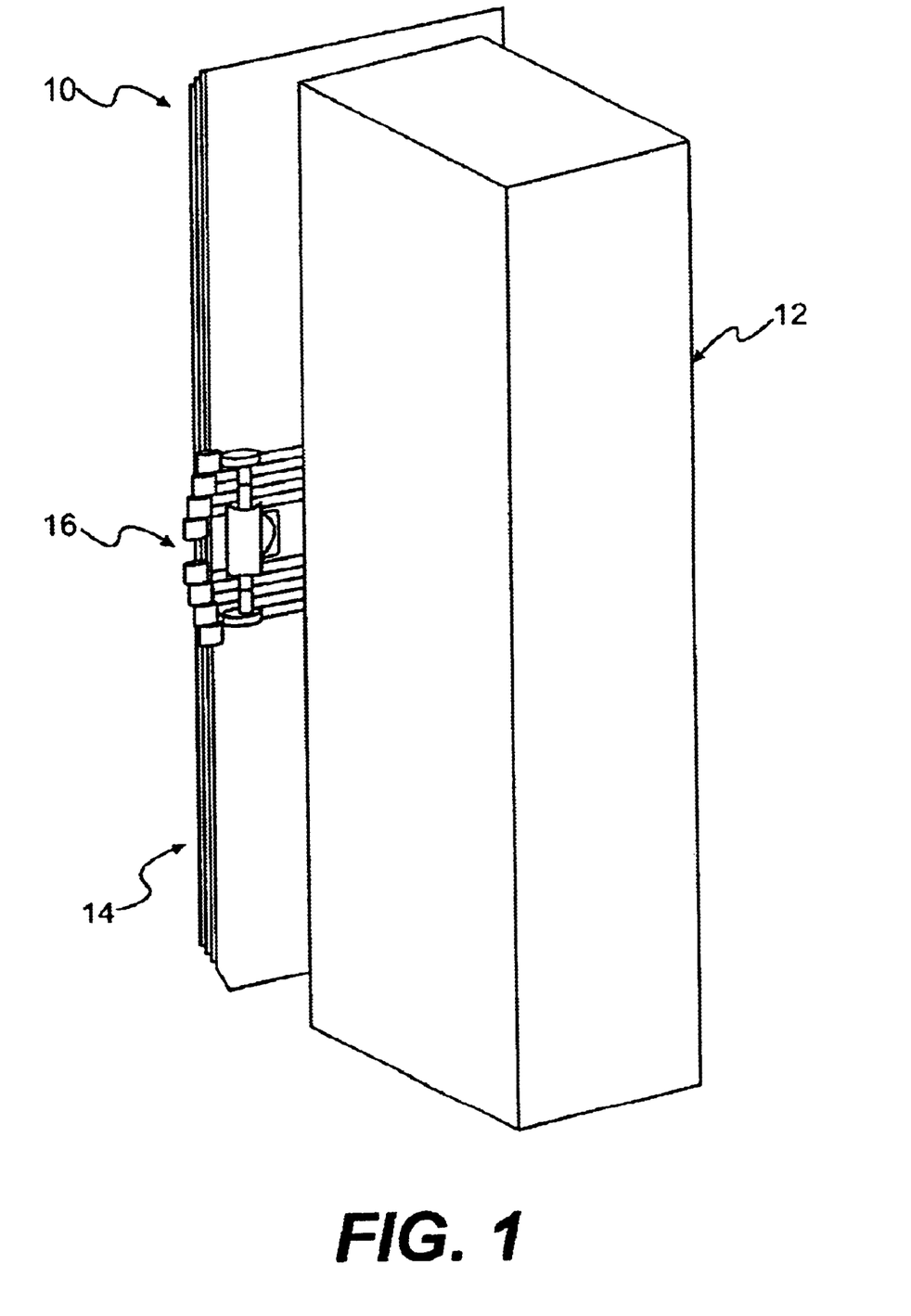
FIG. 1 is a perspective view of a deployable array according to an embodiment of the present invention shown attached to a space structure and in the stowed position.

Referring to FIG. 1, a deployable structure 10, such as a solar array, is shown attached to a supporting structure 12. The structure 12, for example, could be a structural component for a space station adapted for live-aboard use, or for other types of manned or unmanned spacecraft and/or satellites.

The deployable structure 10 can be launched separate from the support structure, for assembly or connection to the supporting structure 12 or other structures in space. In any event, the deployable structure includes a panel assembly 14 which, when in a stowed position, are essentially disposed one on top of the other to achieve a compact volume. The view of FIG. 1 is of the panel assembly 14 in a stowed disposition, as would be used during launch, or prior to use or deployment after attachment to the supporting structure 12.

Individual panels of the panel assembly 14 are connected to a nesting beam assembly 16 that includes hinges containing appropriate spring and damper actuators or other actuation means. Spring and damper actuators permit the individual panels of the panel assembly 14 to unfold and deploy automatically upon release of means holding the panels in the stowed, or stacked, position. The release means can be a separate series of release devices, or ties, that are generally known in the field.

Once released, the panels unfold accordion style to allow maximum exposure of the surface of the panels. In one field of use, the panels carry solar cells that are used to generate power for the associated spacecraft or satellite.

Figure 2:
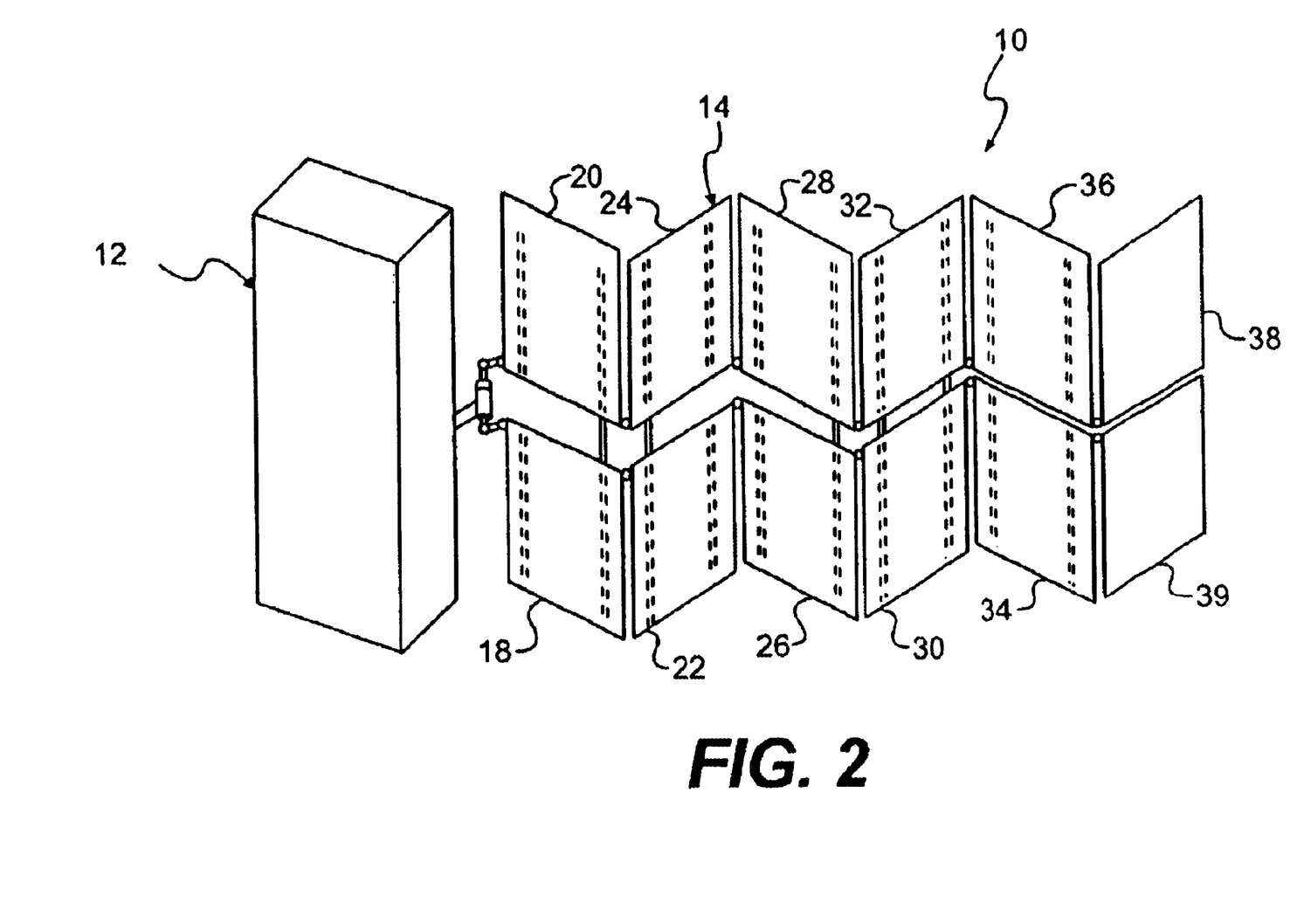
FIG. 2 is a perspective view of the deployable array of FIG. 1, with the panels of the array in a nearly deployed position.

Referring to FIG. 2, the deployable structure 10 is shown with the panels articulated outwardly from the supporting structure 12, approaching a fully deployed position. As seen in FIG. 2, the panels include a first segment comprised of panels 18 and 20, each being connected to the supporting structure 12 through pivotally actuated beams capable of substantially 180° of rotation relative to the supporting structure 12. Together the panels 18 and 20 and corresponding beam sections act as the first panel segment. Each panel 18 and 20 can carry an array of solar cells on its sun-exposed surface.

A second panel segment is pivotally connected to the first panel segment through beams similar in size and shape as the beams supporting the first panel segment. The second panel segment includes panels 22 and 24 which are fastened to the face of the beam element opposite that face on which panels 18 and 20 are connected to in the first segment, so as to allow nesting without interference of the panels. The second panel's support beams are spaced apart so that in the stowed state, the support beams of the second panel segment nest between the support beams of the first panel segment, so that the second panel segment is capable of substantially 180° of rotation relative to the first panel segment.

A third panel segment is pivotally connected to the second panel segment through beams similar in size and shape as the beams supporting the second panel segment. The third panel segment includes panels 26 and 28 which are fastened to the same face of the beam element as panels 18 and 20 in the first panel segment. Thus, panels 26 and 28 are substantially co-planar with panels 18 and 20 in the deployed state. The support beams of the third panel segment are spaced apart so that in the stowed state, the support beams of the third panel segment nest between the support beams of the second panel segment. Thus, the third panel segment is capable of substantially 180° of rotation relative to the second panel segment.

A fourth panel segment is pivotally connected to the third panel segment through beams similar in size and shape as the beams supporting the other panel segments. The fourth panel segment includes panels 30 and 32 which are fastened to the same face of the beam elements as panels 22 and 24 of the second panel segment. The support beams of the fourth panel segment are spaced apart so that in the stowed state, the support beams of the fourth panel segment nest between the support beams of the third panel segment. Thus, the fourth panel segment is capable of substantially 180° of rotation relative to the third panel segment.

A fifth panel segment is pivotally connected to the fourth panel segment through beams similar in size and shape as the beams supporting the other panel segments. The fifth panel segment includes panels 34 and 36 which are fastened to the same face of the beam elements as panels 18 and 20 of the first panel segment. The support beams of the fifth panel segment are spaced apart so that in the stowed state, the support beams of the fifth panel nest between the support beams of the fourth panel segment. Thus, the fifth panel segment is capable of substantially 180° of rotation relative to the fourth panel segment.

A sixth panel segment is pivotally connected to the fifth panel segment through beams similar in size and shape as the beams supporting the other panel segments. The sixth panel segment includes two panels 38 and 39 which are fastened to the same face of the beam elements as panels 22 and 24 of the second panel segment. Optionally, since it is the last of the panels, it can also be constructed as a single planar member. The support beams of the sixth panel segment are spaced apart so that in the stowed state, the support beams of the sixth panel segment nest between the support beams of the fifth panel segment. Thus, the sixth panel segment is capable of substantially 180° of rotation relative to the fifth panel segment.

In the embodiment illustrated in FIGS. 1 and 2, as described above, there are a total of six (6) individual panel segments, each comprised of two panels which are hinged together to deploy in accordion fashion. The invention contemplates that different numbers, sizes and shapes of panels can be employed, depending on the launch constraints and on the intended use of the panels. The size and shape of the solar arrays may be dictated by the required level of electrical power, or by additional factors.

Figure 3:
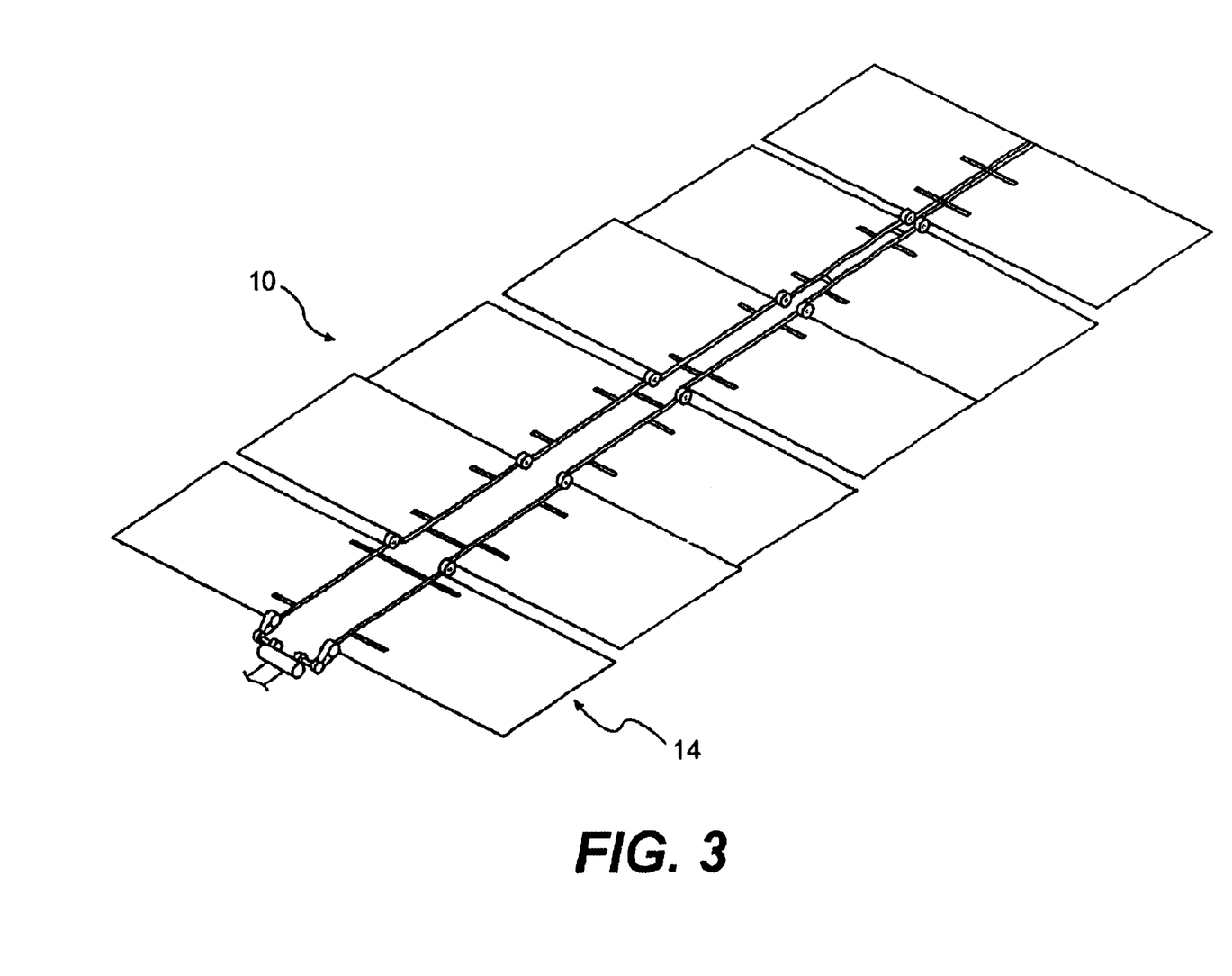
FIG. 3 is a perspective view of the deployable array of FIG. 1, with the panels of the array in a fully deployed position.

As seen in FIG. 3, when the deployable structure 10 is in its fully deployed position, all the panel segments that make up the panel assembly 14 are rotated into a position where half the panels are substantially in a first plane, and the other half are in a second, different plane which is in proximity to the first plane. The angle of the panel assembly 14 relative to the supporting structure 12 can be adjusted in at least two directions to achieve a desired orientation relative to, for example, the axis of the supporting structure 12 or the sun.

Figure 4:
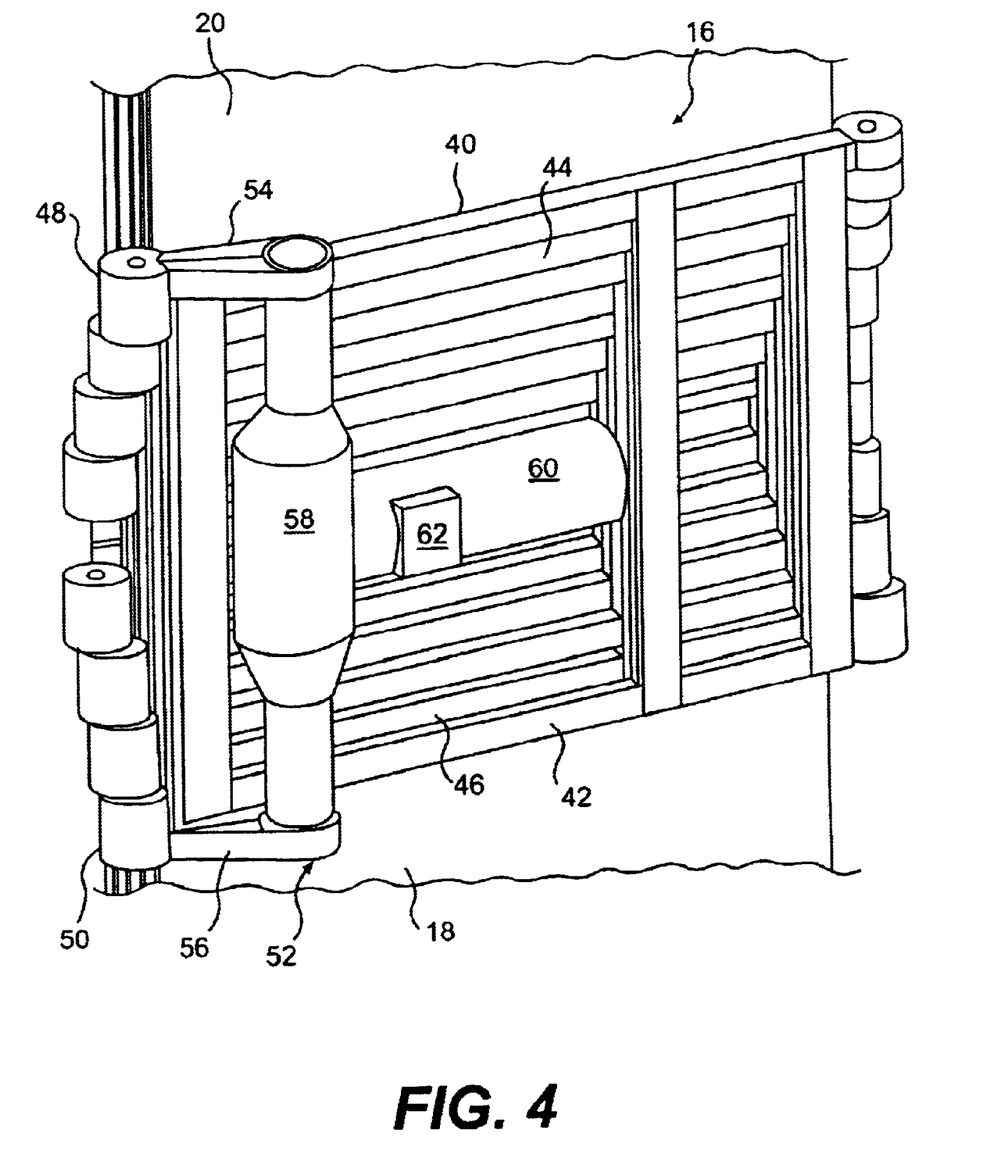
FIG. 4 is an enlarged perspective view of the beam assembly of the deployable array of FIG. 1.

FIG. 4 shows the beam assembly 16 separated from the supporting structure 12. The beam assembly 16 includes a plurality of beams arranged in pairs corresponding to panel segments of the array. Beams 40 and 42 are connected to the panels 18 and 20 of the first panel segment, and are spaced apart by a distance sufficient to receive with relatively close clearances the beams 44 and 46 that are connected to the panels of the second panel segment (not visible in FIG. 4). As can be seen from FIG. 4, the beams all fit within each other to form a nested arrangement which provides a compact, easily deployed structure. Moreover, the arrangement allows for the actuator 52 to be partially nested within the recess created by the nested beams.

Beams 40 and 42 are provided with hinges 48 and 50, respectively, at one of their opposite axial ends, for connecting the hinges 48 and 50 to an actuator 52 that can optionally be used to assist in deployment of the panels into the deployed position. The hinges 48 and 50 are either similar to or identical to the hinges connecting the segments to each other.

The actuator 52 includes a pair of levers 54 and 56 respectively connected to the hinges 48 and 50. The actuator 52 has a first drive 58 that rotates the levers 54 and 56 about an axis of the drive 58. The actuator 52 further includes a second drive 60 that rotates the panels about an axis normal to the axis of the first drive 58. The first and second drives of the actuator are standard commercially available products that are known in the art. A mount 62 is used to connect the actuator 52 and thus the beam assembly 16 and panels to the supporting structure 12.

In other embodiments, there may be no need for an actuator 52, which is also known as the solar array drive assembly, or the drive assembly may only be required to have a single axis of rotation. The drives of the actuator may be, for example, electric motors that receive power from on-board batteries, which are recharged by the solar array.

Figure 5:
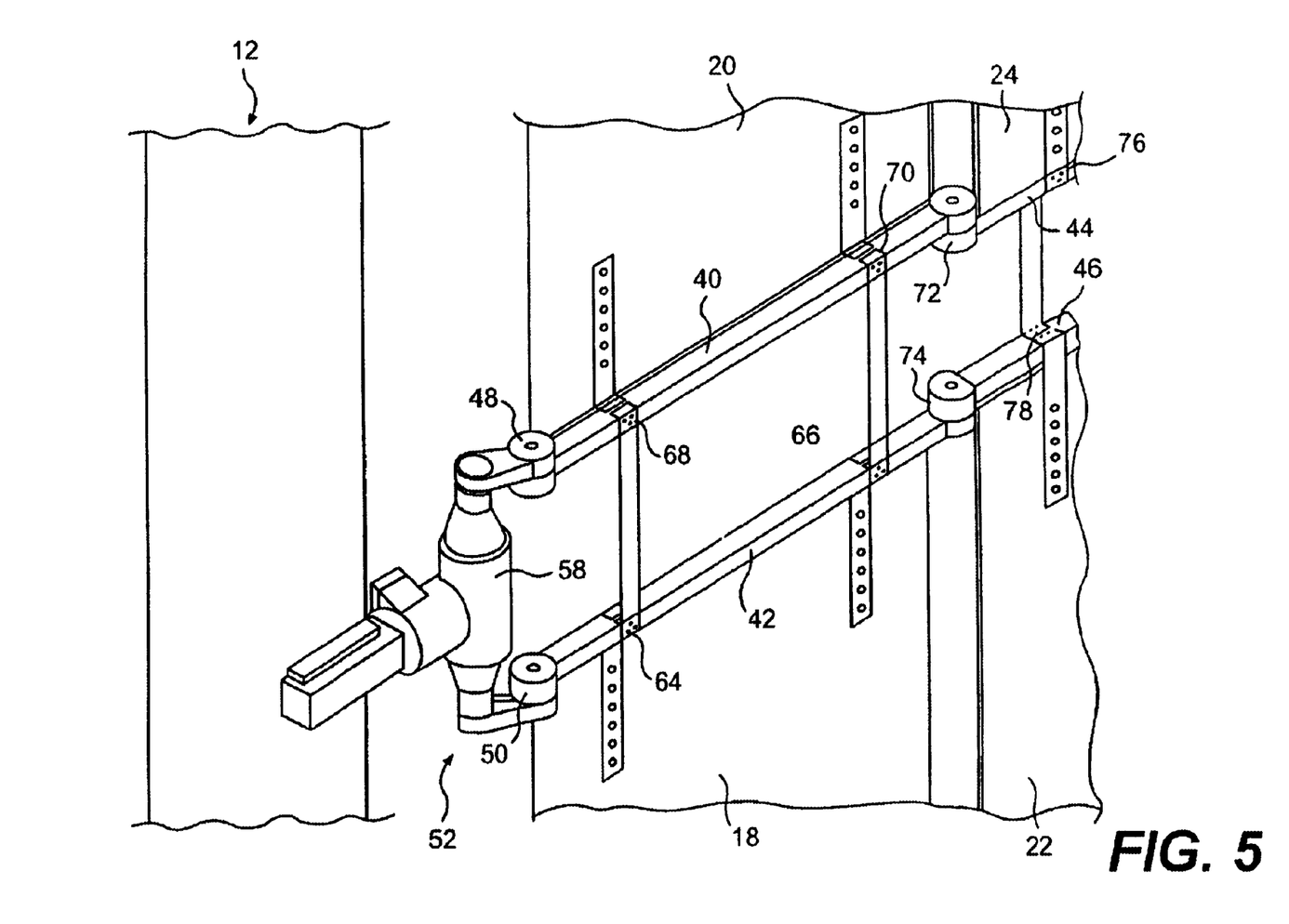
FIG. 5, is an enlarged, perspective view of showing in detail the first two beams of the beam assembly in a deployed position.

FIG. 5 shows a detailed view of the beams 40 and 42 connected to panels 18 and 20, respectively. Panel 18 is attached to beam 42 using brackets 64 and 66 and fasteners, such as threaded fasteners rivets, etc. Panel 20 is similarly attached to beam 40 using brackets 68 and 70 and fasteners.

Additional hinges 72 and 74, which are similar or identical to hinges 48 and 50, are connected to the ends of the beams 40 and 42 opposite the actuator 52 so that the panels 22 and 24 are capable of pivoting into a deployed position in which the panels 22 and 24 are parallel to the panels 18 and 20, and offset by approximately one beam height. Panels 22 and 24 are connected to beams 44 and 46 using brackets 76 and 78, and two additional brackets positioned as in the case of the brackets used on the panels 18 and 20.

All of the hinges used in the beam assembly permit rotation of the beams by about 180° so that when in the stowed position, the beams nest within each other, with the beams 40 and 42 supporting the first panels 20 and 18, and being spaced further apart than the other beam pairs. The beams of successive panels are spaced closer together successively so that when deployed, the panels appear to have a narrow V-shaped gap between the panel segments which comes together towards the distal end of the array.

Figure 6:
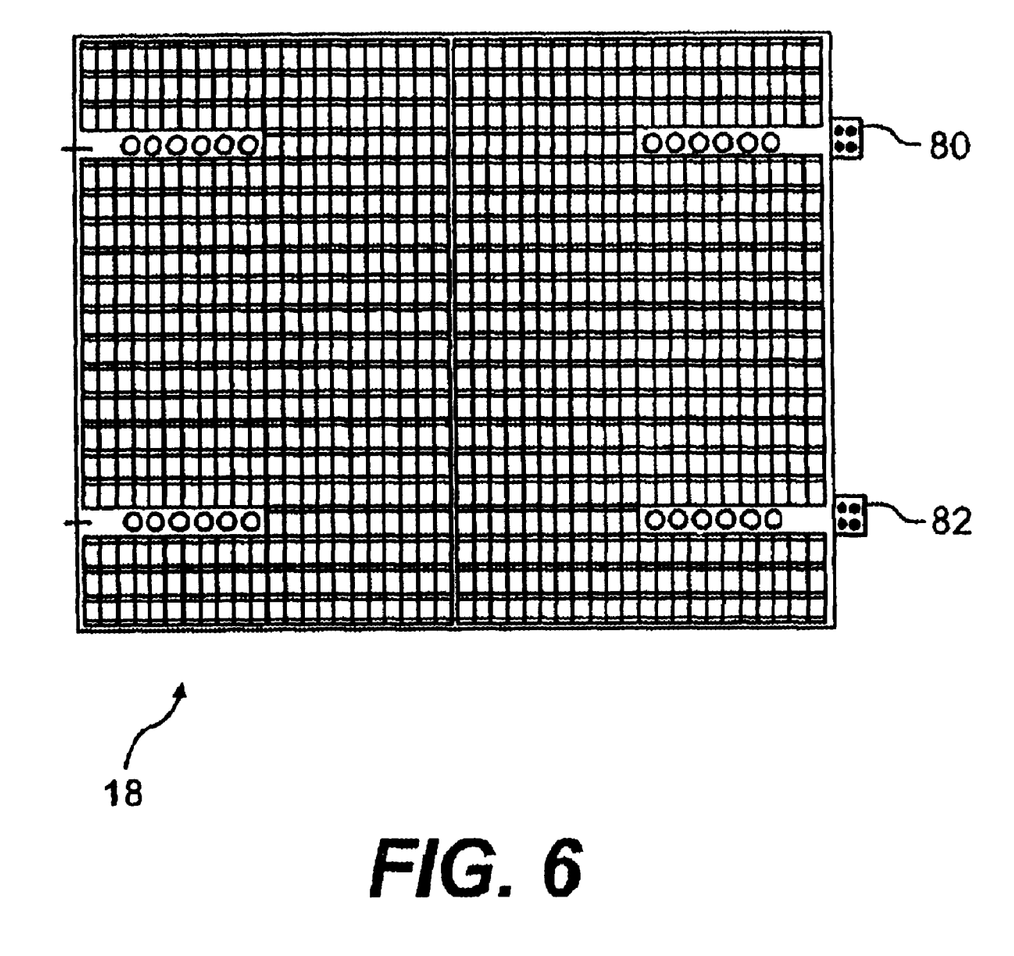
FIG. 6 a plan view of a panel used for a solar array according to the present invention.

FIG. 6 shows a typical panel, such as panel 18, when outfitting for use as a solar panel. The panel 18 is shown with its light-gathering surface populated with power-generating solar cells. The cells are removed at four locations to provide spaces 80 and 82. Similar spaces are provided on the opposite end of the panels. These spaces house an array of locations for shear ties or other means that provide a location to hold the panels of the array in the stowed configuration. The spacing between the shear tie locations is equal to the amount of stagger from one panel to the next.

Figure 7:
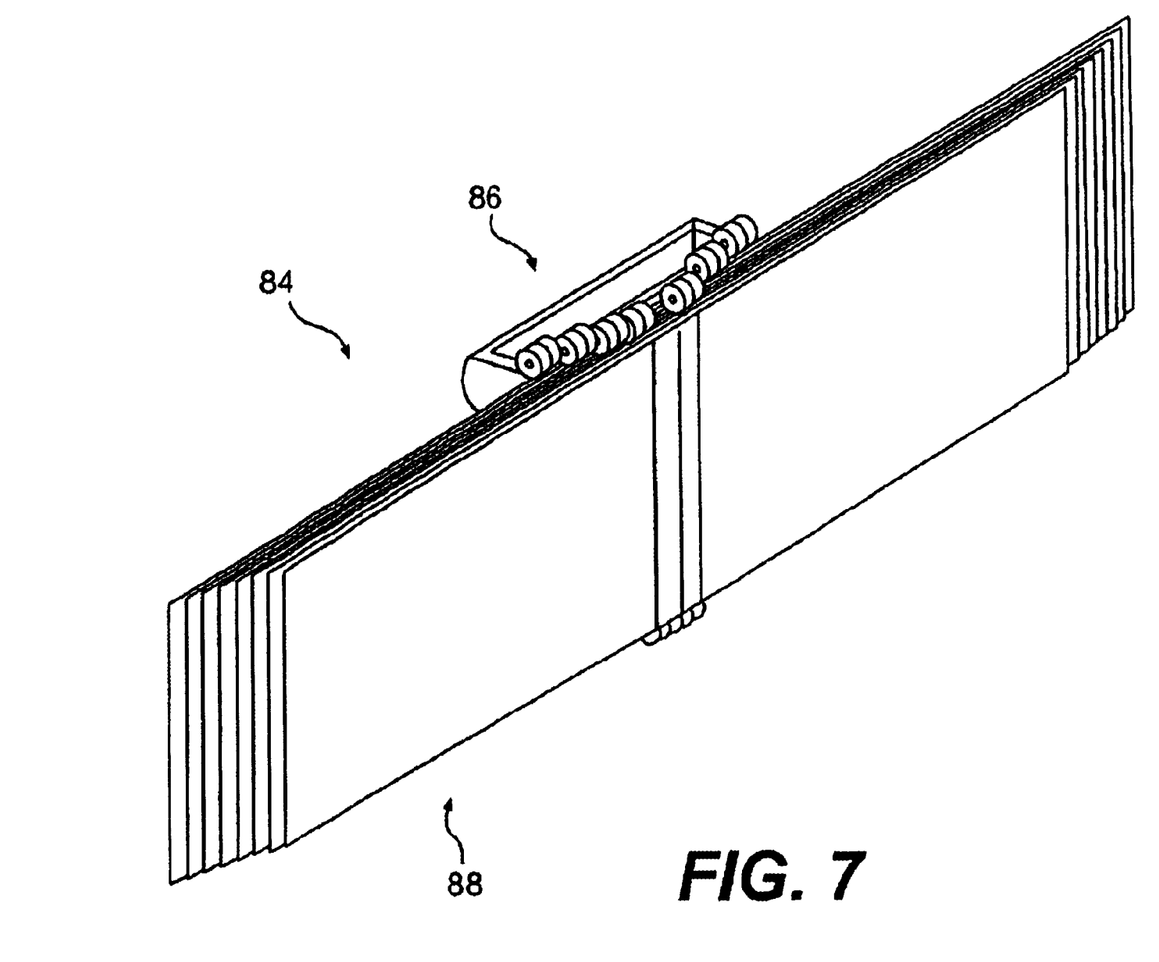
FIG. 7 is a perspective view of another embodiment of a deployable structure according to the present invention in a stowed position.

An additional embodiment of the invention is shown in FIG. 7, in which a deployable structure 84 includes a beam assembly 86 and a plurality of panels 88. The panels may, for example, carry solar arrays for use in space in association with providing power to a spacecraft or satellite.

Figure 8:
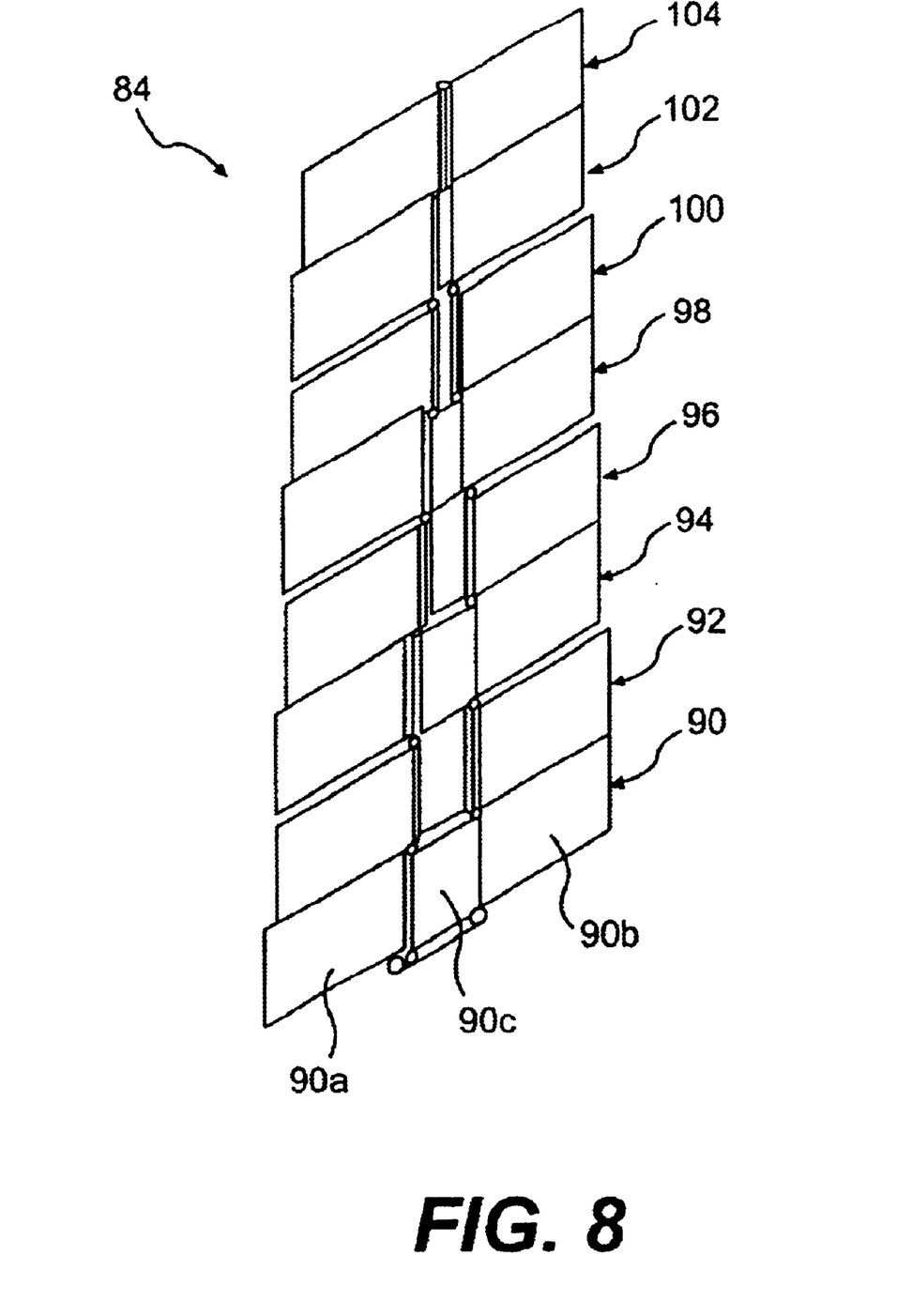
FIG. 8 is a perspective view of the deployable structure of FIG. 7 in a fully deployed position.

As seen in FIG. 8, the deployable structure 84 includes a plurality of panels 90, 92, 94, 96, 98, 100, 102, and 104. The panels are mounted on beams as in the previous embodiment that nest within each other, but in this embodiment most of the panels comprise two side panel sections, such as panel sections 90a and 90b, and a center panel section 90c which spans the space between the two beams on which the panel sections 90a and 90b are mounted.

Figure 9:
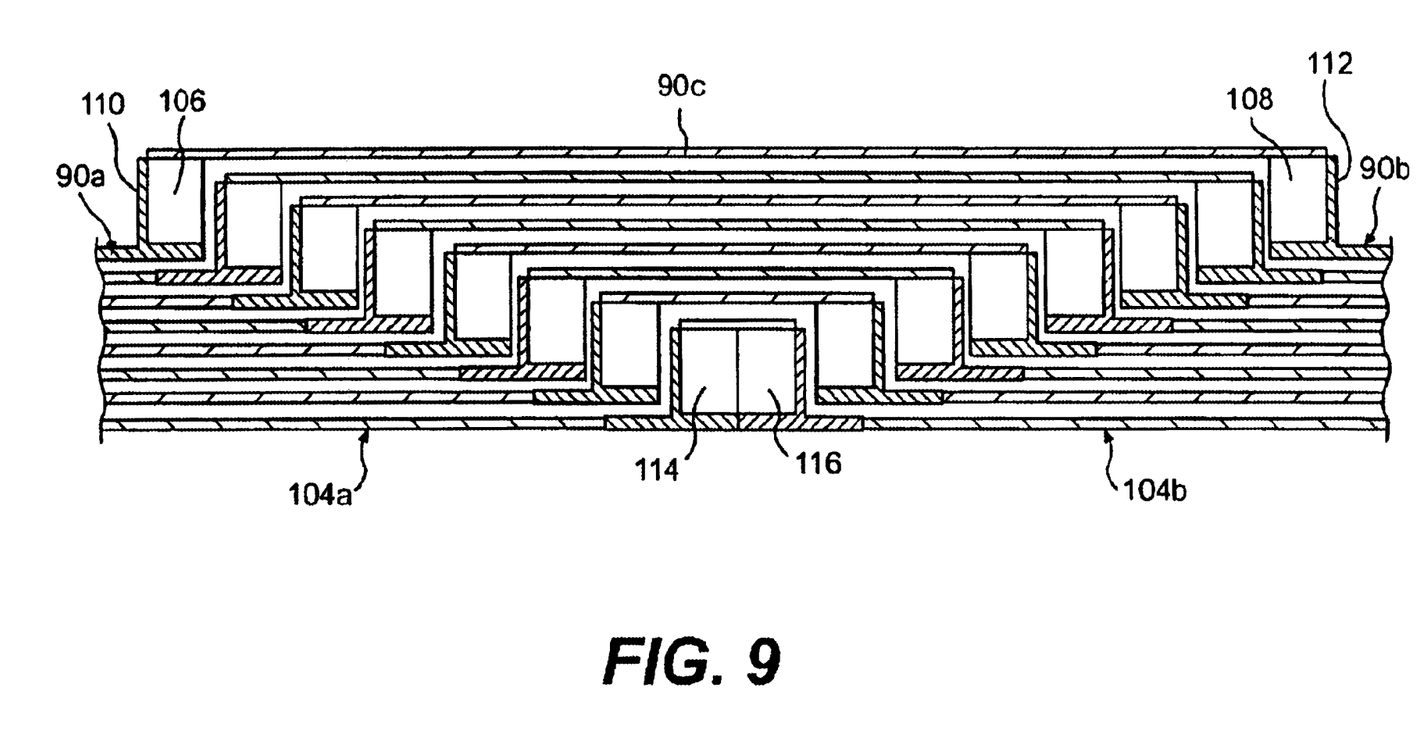
FIG. 9 is a cross-sectional view showing the beams nested together for the embodiment of FIG. 7.

As seen in FIG. 9, beams 106 and 108 are fixedly connected to the center panel 90c at one surface of the beams, while the outer panels 90a and 90b are fixedly connected to the opposite surface of the beams. This construction leaves an overall broad and shallow "U" shaped form that, coupled with the other U-shaped structures, are nested together as seen in FIG. 9 prior to deployment. The center panel 90c can be populated with solar cells to increase the output of the solar array.

The side panels 90a and 90b can be attached to the beams 106 and 108 using any suitable means. In the illustrated embodiment, the beams 106 and 108 abut ribs 110 and 112, respectively, integrally formed along an inner surface of the panels 90a and 90b substantially normal to the plane of the panels. These ribs are useful in strengthening the connection between the beams and the panels, and also assist in stiffening the panels themselves. It is noteworthy that from the illustration of FIG. 9, the end portions of the panels also appear somewhat thicker than the outer portions of the panels. This again adds strength to the connections with the beams and also enhances the stiffness of the panels. The beams can be secured to these end portions using any appropriate means, including adhesives and/or threaded fasteners or other types of fasteners.

The last panel in the array, designated by the reference numeral 104 in FIG. 8, is seen in FIG. 9 to include two side panels sections 104a and 104b. Given the fact that the beams 114 and 116 that support the panels sections are relatively closely spaced, there is no need for a separate center panel section. Indeed, the two beams 114 and 116 can be considered as one, with the panel sections 104a and 104b also appearing as a single unitary panel. A modification of this embodiment would be to make a single beam, single panel for the last panel of the array.

The beams shown in FIG. 9 have the same type of arrangement as the previous embodiment with respect to the inclusion of hinges, or other structure, which permits the ends of adjacent beams to be pivotally connected to each other. These pivotal connections facilitate the movement of the panels from the stowed position shown in FIG. 7, to the deployed position shown in FIG. 9.

The various embodiments describe the use of panels connected to beams. The beams themselves are preferably hollow box-beams made of composite materials in which the walls of the "box" are thin, light, and very strong. The beams preferably have end portions that are adhesively or otherwise bonded to the ends of the beams, thereby closing off the otherwise open ends. The end portions are preferably made of light, strong materials such as titanium or aluminum.

While the invention has been described above with respect to solar arrays, the invention could be used for deployable structures in which a beam assembly has a plurality of beams pivotally connected to each other. The beams are foldable between a first, stowed position in which the beams assume a substantially nested orientation and a second, deployed position in which the beams extend substantially end-to-end. A plurality of panels connected respectively to the plurality of beams. As noted, the "panels" can be any substantially planar member that is connected to the beams to facilitate folding into a nested position.

The invention also includes methodology including a method of deploying a solar array or other deployable structure. With respect to a solar array, the beam assembly allows the panels of a solar array to be stacked one on top of the other for compact storage during launch, and prior to deployment. Typically, the stowed panels are placed in the cargo bay of a spacecraft, such as the Space Shuttle. After launch, and once a desired orbit has been obtained, the cargo bay doors are opened, and a space structure, such as a satellite, is released. The space structure may include the stowed solar array that is connected to the structure. Alternatively, the solar array can be separately stowed, and assembled in situ by astronauts.

Preferably, in the stowed position, the panels are held in place by shear ties or other frangible or detachable fasteners. In the drawings, the panels are shown to have apertures or holes provided along outer edges of the panels. At least one of the holes of all the panels align at each location so that a shear tie can pass through all of the panels and thereby hold the panels in position one on top of the other. The shear ties can be released by any conventional means, whether mechanical or by pyrotechnics. Once these shear ties are released, springs built into each hinge causes the beams to assume their deployed positions, which is basically end-to-end. In other words, the proximal ends of the first beams are connected to the space structure through an actuator or other coupling device. The distal ends of the first beams are connected to the proximal ends of the second beams, and so on.

Once the shear ties are released, deployment is essentially automatic in the preferred embodiment. Alternatively, motors coupled to linkages could be used to deploy the panels, but this active deployment method may be associated with greater complexity, weight and cost. Once deployed, the panels assume a position where the panels are not co-planar but extend substantially outwardly from the supporting structure and away from each other in more or less linear fashion. Since alternating ones of the panels are connected to opposite sides of the beams, the panels will lie substantially in two planes space apart from each other by the thickness of the beams.

Figure 10:
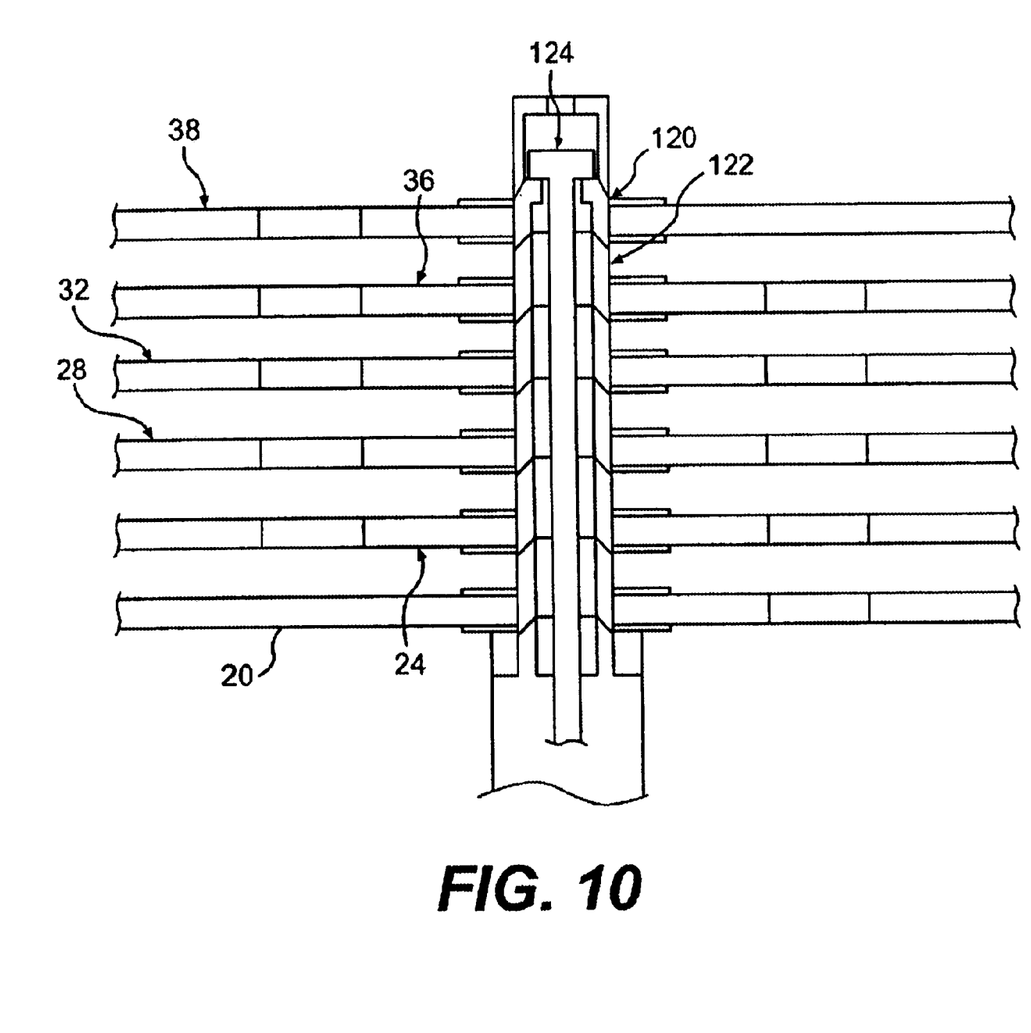
FIG. 10 is a cross-sectional view showing details of a shear tie device for holding the panels of a solar array in a stowed position.

FIG. 10 shows an example of a device for holding the panels in a stowed position. In particular, panels 20, 24, 28, 32, 36, and 38 are shown in the stowed, stacked one on top of the other orientation. Generally, the holes provided in each of the panels for the shear ties are aligned so that at least one hole position is common to all panels. In the illustration of FIG. 10, each panel has a hole 120 which is vertically aligned with all panels so that a shear tie 122 frangibly connects all panels until operated upon by release cable 124. Preferably, the panels are held together prior to deployment by four shear ties per panel, so that a total of eight would be employed for the embodiment described herein.

Other means can be used to hold the panels together prior to deployment, although shear ties of the type described above have been used in the past with respect to other solar arrays. They are of particular use when using hinges of the type preferred herein, which include springs or other means for automatic unfolding. Once the shear ties are released, the springs in the hinges cause the beams to unfold and assume the deployed position. The hinges may also include dampening means to keep the spring force for forcing beams into deployment with unacceptable levels of inertia. In any event, once the beams assume a generally linear orientation (in the deployed state), the hinges will lock into position automatically when fully extended.

In the embodiments where springs are used in the hinges, by folding the beams into the nested, stowed position the springs develop a spring force which will force the beams to unfold into the deployed position.

As noted above, alternative embodiments could employ spring-less hinges which require other means to initiate deployment.

The deployable beam assembly described herein could be used as a standalone deployable device used in connection with other structures to provide, for example, a deployable boom for supporting a separate antenna structure, instrument or the like.

Although the invention has been described with reference to particular embodiments, it will be understood to those skilled in the art that the invention is capable of a variety of alternative embodiments within the spirit of the appended claims.

What is claimed is:

1. A deployable structure comprising:
   a beam assembly including a plurality of beams pivotally connected to each other and being foldable between a stowed position in which the beams assume a substantially nested orientation and a deployed position in which the beams end substantially end-to-end; and
   a plurality of panels connected respectively to the plurality of beams.

2. A deployable structure according to claim 1, further comprising means for connecting the plurality of beams to a supporting structure.

3. A deployable structure according to claim 2, wherein the deployable structure is a solar ray, and the supporting structure is a spacecraft.

4. A deployable structure according to claim 3, wherein the connecting means includes means for articulating the beam assembly about at least one axis.

5. A deployable structure according to claim 4, wherein the connecting means includes a bracket and the articulating means includes a motor connected to the bracket.

6. A deployable structure according to claim 1, wherein each of the plurality of beams includes a support member having a proximal end and a distal end, and the beam assembly further includes a plurality of hinges, each pivotally connecting adjacent ones of the support members.

7. A deployable structure according to claim 1, wherein each of the plurality of beams includes a pair of support arms, each pair having a proximal end and a distal end, and the beam assembly further includes a plurality of hinges, each pivotally connected adjacent ones of the pairs of support arms.

8. A deployable structure according to claim 7, wherein the pairs of support beams include a first pair of support arms having proximal ends and distal ends, first hinges disposed respectively on the proximal ends of the first pair of support arms, and second hinges disposed respectively on the distal ends of the first pair of supporting arms.

9. A deployable structure according to claim 8, wherein the pairs of support beams include a second pair of support arms having proximal ends and distal ends, the proximal ends being connected to the second hinges of the first pair of support arms, and third hinges at the distal ends of the second pair of support arms.

10. A deployable structure according to claim 9, wherein the pairs of support beams include a third pair of support arms having proximal ends and distal ends, the proximal ends being connected to the third hinges of the second pair of support arms, and fourth hinges disposed at the distal ends of the third pair of support arms.

11. A deployable structure according to claim 10, wherein the pairs of support beams include fourth pair of support arms having proximal ends and distal ends, the proximal ends being connected to the fourth hinges of the third pair of support arms, and fifth hinges disposed at the distal ends of the fourth pair of support arms.

12. A deployable structure according to claim 11, wherein the pairs of support beams include a fifth pair of support arms having proximal ends and distal ends, the proximal ends being connected to the fifth hinges of the fourth pair of support arms, and sixth hinges disposed at the distal ends of the fifth pair of support arms.

13. A deployable structure according to claim 12, wherein the pairs of support beams include a sixth pair of support arms having proximal ends and distal ends, the proximal ends being connected to the sixth hinges of the fifth pair of support arms.

14. A deployable structure according to claim 1, wherein the plurality of beams includes first and second pairs of support arms, the first pair being spaced apart by a distance sufficient to receive the second pair of support arms therebetween when the deployable structure is in a stowed position.

15. A deployable structure according to claim 14, wherein the second pair of support arms is spaced apart by a distance sufficient to receive a third pair of support arms therebetween when the deployable structure is in a stowed position.

16. A deployable structure according to claim 15, further comprising a fourth pair of support arms, wherein the third pair of support arms is spaced apart by a distance sufficient to receive the fourth pair of support arms therebetween when the deployable structure is in a stowed position.

17. A deployable structure according to claim 1, wherein the beams have first and second opposite sides, and the plurality of panels includes a first panel connected to the first side of a first beam, a second panel connected to the second side of a second beam, and a third panel connected to the first side of a third beam.

18. A deployable structure according to claim 17, further comprising a fourth beam having first and second opposite sides, and the plurality of panels includes a fourth panel connected to the second side of the fourth beam.

19. A method of deploying a solar array comprising the steps of:
    folding a beam assembly including a plurality of beams pivotally connected to each other to adopt a fist, stowed position in which the beams assume a substantially nested orientation, wherein the beams are connected to a plurality of panels which, in the stowed position, are stacked one on top of the other, and wherein the folding generates a spring force;
    holding the panels in stowed position with holding means; and
    releasing the holding means so that the beams unfold using the spring force into a second, deployed position.

20. A method according to claim 19, wherein the holding includes passing at least one shear tie through the panels, and the releasing step includes releasing the at lent one shear tie.

21. A method according to claim 19, further comprising placing the folded beams and panels in a cargo bay of a launch vehicle, launching the launch vehicle into space, and removing the folded beams and panels froze the cargo bay.

22. A method according to claim 19, wherein the releasing step includes releasing the holding means and moving the beams from the first, stowed position to the second, deployed position.

\* \* \* \* \*

UNITED STATES PATENT AND TRADEMARK OFFICE
CERTIFICATE OF CORRECTION

PATENT NO.    : 6,637,702 B1
DATED         : October 28, 2003
INVENTOR(S)   : John Gregory McCandless

It is certified that error appears in the above-identified patent and that said Letters Patent is hereby corrected as shown below:

<u>Column 8,</u>
Line 48, "end substantially" should read -- extend substantially --.

<u>Column 10,</u>
Line 23, "fist" should read -- first --.
Line 36, "lent" should read -- least --.

Signed and Sealed this

Thirty-first Day of August, 2004

JON W. DUDAS
*Director of the United States Patent and Trademark Office*